United States Patent
Nicodemus et al.

(10) Patent No.: US 11,809,180 B2
(45) Date of Patent: Nov. 7, 2023

(54) METHOD FOR CONTROLLING A MOTOR VEHICLE REMOTELY

(71) Applicant: Robert Bosch GmbH, Stuttgart (DE)

(72) Inventors: Rolf Nicodemus, Bietigheim-Bissingen (DE); Stefan Nordbruch, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 141 days.

(21) Appl. No.: 17/018,215

(22) Filed: Sep. 11, 2020

(65) Prior Publication Data
US 2021/0089028 A1 Mar. 25, 2021

(30) Foreign Application Priority Data
Sep. 23, 2019 (DE) .................... 102019214429.2

(51) Int. Cl.
*G05D 1/00* (2006.01)
*G07C 5/08* (2006.01)

(52) U.S. Cl.
CPC ......... *G05D 1/0044* (2013.01); *G05D 1/0022* (2013.01); *G05D 1/0055* (2013.01); *G07C 5/0841* (2013.01)

(58) Field of Classification Search
CPC .. G05D 1/0044; G05D 1/0022; G05D 1/0055; G05D 2201/0213; G05D 1/0282; G07C 5/0841; B60W 50/00; B60W 2050/0075; B60W 2556/45; G08G 1/096708
See application file for complete search history.

(56) References Cited

U.S. PATENT DOCUMENTS

2016/0253907 A1* 9/2016 Taveira ................ G08G 5/0039
                                                        701/3
2018/0174446 A1* 6/2018 Wang ............... G08G 1/096716
(Continued)

FOREIGN PATENT DOCUMENTS

DE  102009040221 A1  3/2011
DE  102012011501 A1  12/2013
(Continued)

*Primary Examiner* — Jess Whittington
*Assistant Examiner* — Brian E Yang
(74) *Attorney, Agent, or Firm* — NORTON ROSE FULBRIGHT US LLP; Gerard Messina

(57) ABSTRACT

A method for controlling a motor vehicle remotely. The method includes: receiving requirement signals, which represent at least one requirement that is in force for a restricted geographic region and must be followed by motor vehicles; receiving navigation signals, which represent a route to be traveled by the motor vehicle; based on the navigation signals, checking if the at least one requirement is being followed by the motor vehicle; the checking including a check as to whether the route to be traveled by the motor vehicle violates the at least one requirement; generating remote control signals for controlling a lateral and/or longitudinal guidance of the motor vehicle remotely, based on a result of the check as to whether the at least one requirement is being followed by the motor vehicle; outputting the generated remote control signals. A device, a computer program and a machine-readable storage medium, are also described.

20 Claims, 2 Drawing Sheets

(56) References Cited

U.S. PATENT DOCUMENTS

2021/0039669 A1* 2/2021 Watson ................. B60W 50/04
2021/0134154 A1* 5/2021 Wang ............... G08G 1/096811
2022/0050455 A1* 2/2022 Byrnes .................... H04L 67/12

FOREIGN PATENT DOCUMENTS

| DE | 102017213204 A1 | 2/2019 |
|----|-----------------|--------|
| DE | 102018216003 A1 | 4/2019 |
| DE | 112016007093 T5 | 5/2019 |
| WO | 2018038700 A1   | 3/2018 |
| WO | 2019028464 A1   | 2/2019 |

* cited by examiner

METHOD FOR CONTROLLING A MOTOR VEHICLE REMOTELY

CROSS REFERENCE

The present application claims the benefit under 35 U.S.C. § 119 of German Patent Application No. DE 102019214429.2 filed on Sep. 23, 2019, which is expressly incorporated herein by reference in its entirety.

FIELD

The present invention relates to a method for controlling a motor vehicle remotely. In addition, the present invention relates to a device, a computer program and a machine-readable storage medium.

BACKGROUND INFORMATION

Currently, there are legal requirements that under certain circumstances, motor vehicles are no longer allowed to travel into a city or into a particular area of a city. For example, emissions requirements are one reason.

Such a ban is implemented, for example, by signs, which signal that entry into a certain area or into the city is prohibited for a motor vehicle. In some instances, there may be police checks that monitor the ban.

German Patent Application No. DE 10 2018 216 003 A1 describes a method for supporting the control of a driving machine of a vehicle.

German Patent Application No. DE 11 2016 007 093 T5 and PCT Application No. WO 2018/038700 A1 describe a vehicle access authorization.

PCT Application No. WO 2019/028464 A1 describes a system and a method for automatically controlling activation and deactivation of an autonomous operation of vehicles.

SUMMARY

An object of the present invention is to provide for efficiently allowing one to efficiently check or control whether a motor vehicle may travel into a restricted geographic region or within a restricted geographic region, for which the at least one requirement that must be followed by motor vehicles is in force.

This object may be achieved with the aid of example embodiments of the present invention. Advantageous refinements of the present invention are described herein.

According to one aspect of the present invention, a method for controlling a motor vehicle remotely is provided. In accordance with an example embodiment of the present invention, the method includes the following steps:
  receiving requirement signals, which represent at least one requirement that is in force for a restricted geographic region and must be followed by motor vehicles;
  receiving navigation signals, which represent a route to be traveled by the motor vehicle;
  based on the navigation signals, checking if the at least one requirement is being followed by the motor vehicle; the checking including a check as to whether the route to be traveled by the motor vehicle violates the at least one requirement;
  generating remote control signals for controlling a lateral and/or longitudinal guidance of the motor vehicle remotely, based on a result of the check as to whether the at least one requirement is being followed by the motor vehicle;
  outputting the generated remote control signals.

According to a second aspect of the present invention, a device is provided, which is configured to execute all of the steps of the method according to the first aspect.

According to a third aspect of the present invention, a computer program is provided, which includes commands that, in response to the execution of the computer program by a computer, for example, by the device according to the second aspect, cause it to implement a method according to the first aspect.

According to a fourth aspect of the present invention, a machine-readable storage medium is provided, in which the computer program according to the third aspect is stored.

In accordance with example embodiments of the present invention, in response to noncompliance with the requirement by, or due to, the motor vehicle, the above-mentioned object may be achieved by assuming remote control over the motor vehicle, in particular, even while the motor vehicle is moving. Thus, this means, in particular, that the motor vehicle is checked or controlled remotely, if the motor vehicle does not follow the at least one requirement.

This may produce, for example, the technical advantage that one may efficiently check or control that motor vehicles, which intend to travel into the region, or which are travelling inside of the region, are traveling in a manner conforming to the requirement.

In this connection, the technical advantage of the lateral and/or longitudinal guidance of the motor vehicle being controlled remotely is, in particular, that the motor vehicle may be controlled remotely in an efficient manner.

Since the route to be traveled is checked as to whether it violates the at least one requirement, it may be checked, in an efficient manner, whether or not the at least one requirement is being followed by the motor vehicle.

Thus, this produces, in particular, the technical advantage that a concept is provided, which efficiently allows it to be ensured, that motor vehicles, which intend to travel into the region or travel inside of the region, travel in a manner conforming to the requirement.

In the case in which the remote control signals are remote control signals for controlling the lateral or the longitudinal guidance of the motor vehicle, one specific embodiment provides that in each instance, the other guidance, that is, the longitudinal guidance or the lateral guidance, be either controlled manually by the driver (which may then be referred to, in particular, as assisted driving), or controlled in an at least semiautomated manner, in order to drive the motor vehicle in an at least semiautomated manner.

Assisted driving means, in particular, that a driver of the motor vehicle permanently carries out either the lateral guidance or the longitudinal guidance of the motor vehicle. The other respective driving task (that is, controlling the longitudinal or the lateral guidance of the motor vehicle) is carried out remotely in an automatic manner. Therefore, this means that in the case of assisted driving of the motor vehicle, either the lateral or the longitudinal guidance is controlled remotely in an automatic manner.

The wording "at least semiautomated driving" includes one or more of the following cases: semiautomated driving, highly automated driving, fully automated driving.

Semiautomated driving means that in a specific situation (for example: driving on an expressway, driving within a parking lot, passing an object, driving within a traffic lane, which is defined by lane markings) and/or for a certain period of time, longitudinal and lateral guidance of the motor vehicle are controlled remotely in an automatic manner. A driver of the motor vehicle does not have to manually control the longitudinal and lateral guidance of the motor vehicle himself/herself. However, the driver must monitor the automatic, remote control of the longitudinal and lateral guidance continuously, in order to be able to manually intervene, if necessary. The driver must be ready to completely take over the driving of the motor vehicle at any time.

Highly automated driving means that for a certain period of time, in a specific situation (for example: driving on an expressway, driving within a parking lot, passing an object, driving within a traffic lane, which is defined by lane markings), longitudinal and lateral guidance of the motor vehicle are controlled remotely in an automatic manner. A driver of the motor vehicle does not have to manually control the longitudinal and lateral guidance of the motor vehicle himself/herself. The driver does not have to monitor the automatic, remote control of the longitudinal and lateral guidance continuously, in order to be able to intervene manually, as required. If necessary, a take-over request to the driver for assuming the control of the longitudinal and lateral guidance is outputted automatically, in particular, outputted with adequate time to spare. Thus, the driver must be potentially able to take over the control of the longitudinal and lateral guidance. Limits of the automatic, remote control of the lateral and longitudinal guidance are detected automatically. In the case of highly automated driving, it is not possible to bring about a minimum-risk state automatically in every initial situation.

Fully automated driving means that in a specific situation (for example: driving on an expressway, driving within a parking lot, passing an object, driving within a traffic lane, which is defined by lane markings), longitudinal and lateral guidance of the motor vehicle is controlled remotely in an automatic manner. A driver of the motor vehicle does not have to manually control the longitudinal and lateral guidance of the motor vehicle himself/herself. The driver does not have to monitor the automatic, remote control of the longitudinal and lateral guidance, in order to be able to intervene manually, when necessary. Prior to an end of the automatic, remote control of the lateral and longitudinal guidance, a request for the driver to take over the driving task (controlling the lateral and longitudinal guidance of the motor vehicle) is made automatically, in particular, with adequate time to spare. If the driver does not assume the driving task, then a return is made automatically to a minimum-risk state. Limits of the automatic control of the lateral and longitudinal guidance are detected automatically. In all situations, it is possible to return automatically to a minimum-risk system state.

The route includes, in particular, a target position. The route is, for example, an estimated route. Therefore, the target position is, in particular, an estimated target position.

For example, the region includes at least one road. The at least one requirement is in force, in particular, for the at least one road.

If the region includes a plurality of roads, then, in particular, a specific requirement may be provided for some or all of the plurality of roads. Thus, this means, in particular, that the at least one requirement may be road-specific.

In particular, the at least one requirement may be motor-vehicle-specific. In particular, this means that the at least one requirement only has to be followed by motor vehicles, which have at least one predetermined feature.

In one specific embodiment of the present invention, the at least one requirement is motor-vehicle-specific, which means that the at least one requirement only has to be followed by (specific) motor vehicles that have at least one predetermined feature; it being checked if the motor vehicle has the at least one predetermined feature; the generation of the remote control signals and/or the checking based on the navigation signals being carried out on the basis of a result of the check as to whether the motor vehicle has the at least one predetermined feature.

If the result of the check as to whether the motor vehicle has the at least one predetermined feature, indicates that the motor vehicle does not have the at least one predetermined feature, then, for example, the generation of the remote control signals or the checking on the basis of the navigation signals is refrained from.

If the result of the check as to whether the motor vehicle has the at least one predetermined feature, indicates that the motor vehicle has the at least one predetermined feature, then, for example, the generation of the remote control signals or the checking on the basis of the navigation signals is carried out.

In one specific embodiment of the present invention, the at least one predetermined feature is, in each instance, an element selected from the following group of features: motor vehicle model, year of manufacture, type of driving engine, license plate element, in particular, letter or numeral, order of license plate elements, license plate.

In one specific embodiment of the present invention, the requirement specifies the road(s), which is or are closed to motor vehicles inside of the region; the check as to whether the route to be covered by the motor vehicle violates the at least one requirement, including a check as to whether the route to be traveled at least partially includes at least one road closed to motor vehicles; the remote control signals being generated on the basis of a result of the determination as to whether the route to be traveled at least partially includes at least one road closed to motor vehicles.

This produces, for example, the technical advantage that a closure of a road may be implemented efficiently.

If the route to be traveled at least partially includes at least one road closed to motor vehicles, then it is determined, in particular, that the route violates the at least one requirement. The remote control signals are then, in particular, such, that in response to the remote control of the motor vehicle on the basis of the remote control signals, the motor vehicle is redirected around the correspondingly closed road.

If the route to be traveled does not include at least one road closed to motor vehicles, then it is determined, in particular, that the route does not violate the at least one requirement.

In one specific embodiment of the present invention, the requirement specifies the road(s), which is or are closed to motor vehicles inside of the region.

According to one specific embodiment of the present invention in response to noncompliance with the at least one requirement, the remote control signals are generated in such a manner, that in the case of remote control of the lateral and/or longitudinal guidance of the motor vehicle on the basis of the generated remote control signals, when a motor vehicle is traveling within the region, the motor vehicle leaves the region or stops inside of a predetermined area within the region, or when a motor vehicle intends to travel into the region, the motor vehicle does not enter the region or enters the region and stops in a predetermined area within the region.

This may produce, for example, the technical advantage that the motor vehicle may be efficiently prevented from traveling into the region. In particular, this provides the technical advantage that it may be efficiently ensured, that the motor vehicle only travels up to the predetermined area within the region.

According to one specific embodiment of the present invention, the remote control signals are generated on the basis of the navigation signals.

This may produce, for example, the technical advantage that the remote control signals may be generated efficiently. Therefore, this means, in particular, that the route to be traveled may be taken into account during the generation of the remote control signals.

According to one specific embodiment of the present invention, the navigation signals are transmitted by a navigation system of the motor vehicle. Thus, this means that the navigation signals are, for example, navigation signals of a navigation system of a motor vehicle.

According to one specific embodiment of the present invention, surrounding-area signals are received, which represent a surrounding area of the motor vehicle; the remote control signals being generated on the basis of the surrounding area.

This may produce, for example, the technical advantage that the remote control signals may be generated efficiently. In particular, this produces the technical advantage that a surrounding area of the motor vehicle may be taken into account efficiently during the generation of the remote control signals.

According to one specific embodiment of the present invention, it is checked, on the basis of the surrounding area of the motor vehicle, if a current traffic situation permits remote control of the motor vehicle. In particular, the remote control signals are generated or outputted on the basis of a result of the check as to whether the current traffic situation permits remote control.

For example, remote control of the motor vehicle is refrained from, if the current traffic situation does not permit remote control.

This may produce, for example, the technical advantage that other road users in the surroundings of the motor vehicle are not put at risk or injured.

According to one specific embodiment of the present invention, safety condition signals are received, which represent at least one safety condition that must be satisfied, so that the motor vehicle may be controlled remotely; it being checked if the at least one safety condition is satisfied; the remote control signals being generated on the basis of a result of the check as to whether the at least one safety condition is satisfied.

This may produce, for example, the technical advantage that the remote control signals may be generated efficiently. In particular, this produces the technical advantage that it may be ensured, in an efficient manner, that certain conditions, presently, the safety condition, are satisfied for controlling the motor vehicle remotely. Consequently, in particular, the technical advantage is produced, that if the safety condition is met, the remote control of the motor vehicle is then safely possible.

According to one specific embodiment of the present invention, it is provided that the at least one safety condition be, in each instance, an element selected from the following group of safety conditions: presence of a predetermined safety integrity level (SIL) or automotive safety integrity level (ASIL) of at least the motor vehicle and an infrastructure, in particular, including a communication path and/or communications components (for example, a communications interface), for controlling a motor vehicle remotely (in particular, with regard to the overall systems in the motor vehicle and infrastructure, as well as, in particular, parts, e.g., components, algorithms, interfaces, etc.; presence of a maximum latency time of a communication between the motor vehicle and a remote control device for controlling the motor vehicle remotely on the basis of the remote control signals; presence of a predetermined computer protection level of a device for executing the steps of the method according to the first aspect; presence of predetermined components and/or algorithms and/or communication options, which are used for executing the steps of the method according to the first aspect; presence of redundancy and/or diversity in predetermined components and/or algorithms and/or communication options, which are used for executing the steps of the method according to the first aspect; presence of predetermined availability information, which indicates an availability of predetermined components and/or algorithms and/or communication options; presence of predetermined quality criteria of the predetermined components and/or algorithms and/or communication options; presence of a plan, which includes measures for reducing faults, and/or measures in response to failures of predetermined components and/or algorithms and/or communication options, and/or measures for incorrect analyses and/or measures in response to incorrect interpretations; presence of one or more fallback scenarios; presence of a predetermined function; presence of a predetermined traffic situation; presence of predetermined weather, maximum possible time for a specific performance or execution of one step or a plurality of steps of the method according to the first aspect; presence of a test result, that elements or functions, which are used for executing the method according to the first aspect, are presently functioning correctly.

A communication path is, for example, a communication path between the device according to the second aspect, and the motor vehicle. A communication path includes, for example, one or more communication channels.

In one specific embodiment of the present invention, a component, which is used for executing the method according to the first aspect, is an element selected from the following group of components: surround sensor, motor vehicle, infrastructure, remote control device, device according to the second aspect, motor vehicle system, in particular, drive system, clutch system, brake system, driver assistance system, communications interface of the motor vehicle or of the infrastructure, processor, input, output of the device according to the second aspect.

In one specific embodiment of the present invention, a function, which is used for executing the method according to the first aspect, is an element selected from the following group of functions: remote control function, communication function between the motor vehicle and the infrastructure or the remote control device, evaluation function of surround sensor data of a surround sensor, planning function, in particular, travel planning function, traffic analysis function, emissions analysis function.

The following determines, in particular, a computer protection level: activated firewall and/or valid encryption certificate for encryption of a communication between the motor vehicle and the infrastructure or the remote control device, and/or activated virus program including current virus signatures, and/or presence of a protection, in particular, mechanical protection, in particular, anti-intrusion protection, of the computer, in particular, of the device according to the second aspect, or of the remote control device, and/or presence of an option for checking that signals, in particular, remote control signals or surrounding-area signals, have been transmitted correctly, that is, error-free.

An algorithm includes, for example, the computer program according to the third aspect.

Since, in particular, it is checked that redundancy and/or diversity is present in predetermined components and/or algorithms and/or communication options, for example, the technical advantage is provided, that in the case of failure of the corresponding component, for example, a computer, or the corresponding algorithm or the corresponding communication option, nevertheless, safe functioning may be implemented.

In order to ensure that results are correct, according to one specific embodiment of the present invention, these may be computed several times, for example, and the corresponding results may be compared to each other. For example, it is only determined that the results are correct, if the results agree. If an odd number occurs several times, it may then be determined, for example, that the result corresponding to the highest number of equal results is correct.

For example, remote control signals are only generated, when it is able to be determined that the result is correct.

In one specific embodiment of the present invention, the remote control signals are only generated, if the at least one safety condition is satisfied.

In one specific embodiment of the present invention, the check as to whether the at least one safety condition is satisfied, is carried out prior to and/or after and/or during one or more predetermined method steps.

In particular, this may produce the technical advantage that it may be ensured in an efficient manner, that certain conditions, presently, the safety condition, are satisfied for controlling the motor vehicle remotely prior to and/or after and/or during the execution of the corresponding method steps. Consequently, in particular, the technical advantage is produced, that if the safety condition is met, the remote control of the motor vehicle is then safely possible.

In one specific embodiment of the present invention, it is provided that after the outputting of the remote control signals, remote control of the motor vehicle be tested on the basis of the outputted remote control signals, in order to detect a fault; in response to the detection of a fault, the remote control being broken off, or emergency remote control signals for controlling the lateral and/or longitudinal guidance of the motor vehicle remotely in an emergency being generated and outputted.

The emergency remote control signals are, for example, such, that in the case of the remote control of the lateral and/or longitudinal guidance of the motor vehicle on the basis of the emergency remote control signals, the motor vehicle is carried over into a safe state, in particular, stopped.

In one specific embodiment of the present invention, it is provided that after the outputting of the remote control signals, remote control of the motor vehicle on the basis of the outputted remote control signals is checked, in order to detect a fault; in response to the detection of a fault, the remote control being interrupted, or internal motor vehicle emergency control signals for controlling the lateral and/or longitudinal guidance of the motor vehicle in an emergency being generated and outputted.

The internal motor vehicle emergency control signals are, for example, such, that in the case of the control of the lateral and/or longitudinal guidance of the motor vehicle on the basis of the internal motor vehicle emergency control signals, the motor vehicle is carried over into a safe state, in particular, stopped.

Thus, internal motor vehicle emergency control signals are emergency control signals, which the motor vehicle generates itself and/or are generated in the motor vehicle.

For example, this may produce the technical advantage that in the event of a breakdown of communication, which corresponds, for example, to an emergency, between the motor vehicle and the device according to the second aspect, that is, a remote control device for controlling the motor vehicle remotely, the motor vehicle may also carry itself over into a safe state.

Explanations, which are made in connection with the remote control signals and/or the internal motor vehicle emergency control signals, apply analogously to the emergency remote control signals, and vice versa.

According to one specific embodiment of the present invention, boundary vicinity signals are received, which represent a vicinity of a boundary of the geographic region.

According to one specific embodiment of the present invention, the boundary vicinity signals are processed, in order to detect an arriving motor vehicle, which intends to travel into the geographic region.

According to one specific embodiment of the present invention, the step of checking if the at least one requirement is being followed, is executed in response to detection of an arriving motor vehicle. According to one specific embodiment, in response to detection of an arriving motor vehicle, which intends to travel into the geographic region, the step(s) of receiving navigation signals or requirement signals are executed.

According to one specific embodiment of the present invention, position signals are received, which represent a position of a motor vehicle that intends to travel into the geographic region.

For example, the motor vehicle emits the position signals. In this manner, for example, the motor vehicle may be detected efficiently in an advantageous manner.

According to one specific embodiment of the present invention, in response to detection of an arriving motor vehicle, which intends to travel into the geographic region, the step(s) of receiving navigation signals or requirement signals are executed.

In one specific embodiment of the present invention, boundary vicinity signals are received, which represent a vicinity of a boundary of the geographic region; the boundary vicinity signals being processed, in order to detect an arriving motor vehicle, which intends to travel into the geographic region; in response to detection of an arriving motor vehicle, the step of checking whether the at least one requirement is being followed by the motor vehicle, is executed, and/or the step(s) of receiving navigation signals or requirement signals being executed.

In one specific embodiment of the present invention, it is tested if an entity made up of the motor vehicle and infrastructure involved in the method, including communication between the infrastructure and the motor vehicle, is safe, so that the motor vehicle and/or a local and/or a global infrastructure and/or communication between the motor vehicle and the infrastructure are tested accordingly. In particular, the remote control signals are generated on the basis of a result of the testing.

Thus, this means, in particular, that the components, which are used during the execution of the method according to the first aspect, are tested for safety, that is, as to whether these satisfy specific safety conditions, before the intervention in the vehicle operation is carried out, that is, before the motor vehicle is controlled remotely.

Important or dependent criteria include, for example, one or more of the safety conditions described above.

According to one specific embodiment of the present invention, one or more method steps up to the steps of generating and outputting the remote control signals are executed in the motor vehicle, and/or one or more method steps are executed outside of the motor vehicle, in particular, in an infrastructure, preferably, in a cloud infrastructure.

This may produce, for example, the technical advantage that the corresponding method steps may be carried out in an efficiently redundant manner. In particular, this may further increase safety in an advantageous manner.

According to one specific embodiment of the present invention, one or more method steps are documented, in particular, documented in a blockchain.

The technical advantage of this is, for example, that on the basis of the documentation, this may also be analyzed subsequently after the performance or execution of the method. In particular, the documentation in a blockchain has the technical advantage that the documentation is safe from manipulation and falsification.

A blockchain (also block chain) is, in particular, a continuously expandable list of data records, called blocks, which are linked together with the aid of one or more crytographic methods. In this context, each block contains, in particular, a cryptographically secure hash (standard value of deviation) of the preceding block, in particular, a time stamp and, in particular, transactional data.

According to one specific embodiment of the present invention, outputting the generated remote control signals includes transmitting the remote control signals over a communications network, in particular, over a wireless communications network, to the motor vehicle.

According to one specific embodiment of the present invention, the method according to the first aspect includes controlling the motor vehicle remotely on the basis of the generated remote control signals.

According to one specific embodiment of the present invention, the requirement may indicate and/or specify that a motor vehicle, that is, the motor vehicle specifically intending to enter, may not travel into the region. Thus, for example, the requirement may specify that the region is closed to motor vehicles.

According to one specific embodiment of the present invention, the requirement may specify a maximum permissible motor vehicle speed.

According to one specific embodiment of the present invention, it is provided that the method according to the first aspect be a computer-implemented method.

According to one specific embodiment of the present invention, the method according to the first aspect is executed or performed with the aid of the device according to the second aspect.

Device features of the present invention follow analogously from corresponding method features of the present invention, and vice versa. Thus, this means that, in particular, technical functions of the device according to the second aspect follow analogously from corresponding instances of technical functionality of the method according to the first aspect, and vice versa.

The wording "at least one" stands, in particular, for "one or more."

Exemplary embodiments of the present invention are represented in the figures and explained in greater detail below.

DETAILED DESCRIPTION OF EXAMPLE EMBODIMENTS

Figure 1:
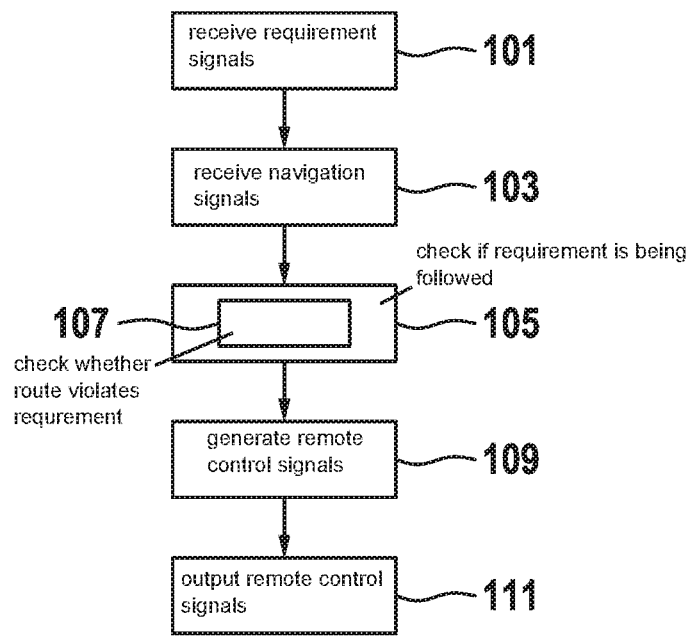
FIG. 1 shows a flow chart of a method for controlling a motor vehicle remotely in accordance with an example embodiment of the present invention.

FIG. 1 shows a flow chart of a method for controlling a motor vehicle remotely, in accordance with an example embodiment of the present invention.

The method includes the following steps:

receiving 101 requirement signals, which represent at least one requirement that is in force for a restricted geographic region and must be followed by motor vehicles;

receiving 103 navigation signals, which represent a route to be traveled by the motor vehicle;

based on the navigation signals, checking 105 if the at least one requirement is being followed by the motor vehicle; the checking 105 including a check 107 as to whether the route to be traveled by the motor vehicle violates the at least one requirement;

generating 109 remote control signals for controlling a lateral and/or longitudinal guidance of the motor vehicle remotely, based on a result of the check as to whether the at least one requirement is being followed by the motor vehicle;

outputting 111 the remote control signals generated.

The result of the checking 105 indicates, for example, that the at least one requirement is being followed or not being followed by the motor vehicle.

The at least one requirement is then followed, for example, by the motor vehicle, if the route to be traveled by the motor vehicle does not violate the at least one requirement.

The at least one requirement is not followed by the motor vehicle, for example, if the route to be traveled by the motor vehicle violates the at least one requirement.

In one specific embodiment of the present invention, it is provided that the remote control signals only be generated, if the result of the check indicates that the at least one requirement is not being followed by the motor vehicle.

In one specific embodiment of the present invention, in response to arrival of the motor vehicle at a boundary of the geographic region, the step of checking 105 is executed or triggered. Thus, this means, in particular, that in response to arrival of the motor vehicle at a boundary of the geographic region, the checking step is executed.

If a result of the checking 105 indicates that the motor vehicle is not following the at least one requirement, one or more actions are carried out, in particular, an intervention is made in the operation of the motor vehicle; thus, this means, in particular, that the motor vehicle is controlled remotely.

According to one specific embodiment of the present invention, the outputting 109 includes that the generated remote control signals are transmitted over a communications network, in particular, over a wireless communications network, to the motor vehicle.

According to one specific embodiment of the present invention, the method according to the first aspect includes the step of controlling the motor vehicle remotely on the basis of the outputted remote control signals.

Figure 2:
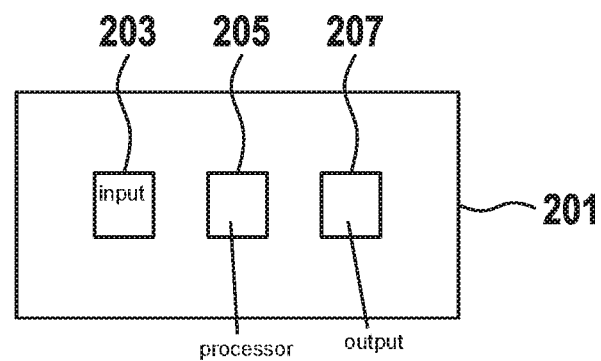
FIG. 2 shows a device in accordance with an example embodiment of the present invention.

FIG. 2 shows a device 201 in accordance with an example embodiment of the present invention.

Device 201 is configured to execute all of the steps of the method according to the first aspect.

Device 201 includes an input 203, which is configured to receive the navigation signals and the requirement signals.

Device 201 further includes a processor 205, which is configured to check, based on the navigation signals, if the at least one requirement is being followed by the motor vehicle; the checking including a check as to whether the route to be traveled by the motor vehicle violates the at least one requirement. Processor 205 is further configured to generate the remote control signals for controlling a lateral and/or longitudinal guidance of the motor vehicle remotely, based on a result of the check as to whether the at least one requirement is being followed by the motor vehicle.

Device 201 further includes an output 207, which is configured to output the remote control signals generated.

According to one specific embodiment of the present invention, device 201 includes a remote control device, which is configured to control the motor vehicle remotely on the basis of the outputted remote control signals.

In one specific embodiment of the present invention, a communication connection to a motor vehicle is set up, which is situated at a predetermined distance from the region.

In one specific embodiment of the present invention, a communication connection to the motor vehicle is set up independently of a distance of a motor vehicle from the region.

For example, the navigation signals are received via this communication connection. Thus, this means, in particular, that the motor vehicle may transmit the navigation signals via this communication connection.

For example, an inquiry about the route to be traveled is transmitted to the motor vehicle. Therefore, this means, in particular, that according to one specific embodiment, the route is requested from the motor vehicle.

If, for example, it is determined that the route runs partially within the region, then, according to one specific embodiment, entry into the region is prevented by generating corresponding remote control signals; or when it is situated inside of the region, the motor vehicle is prevented from driving off, by generating corresponding remote control signals; or the motor vehicle is stopped remotely, by generating corresponding remote control signals.

In general, signals, which are received, are received with the aid of input 203. Thus, input 203 is configured, in particular, to receive the corresponding signals.

In general, signals, which are outputted, are outputted with the aid of output 207. Thus, output 207 is configured, in particular, to output the corresponding signals.

According to one specific embodiment of the present invention, a plurality of processors are provided in place of the one processor 205.

According to one specific embodiment of the present invention, processor 205 is configured to execute the generating and checking steps described above and/or in the following.

In one specific embodiment of the present invention, one or more method steps up to the steps of generating and outputting the remote control signals are executed inside the motor vehicle, and/or one or more method steps are executed outside of the motor vehicle, in particular, in an infrastructure, preferably, in a cloud infrastructure.

Device 201 is, for example, part of an infrastructure, in particular, cloud infrastructure, or part of the motor vehicle.

According to one specific embodiment of the present invention, for redundant execution of the corresponding method steps, a plurality of devices 201 may be provided, so that, for example, both the motor vehicle and the infrastructure, in particular, the cloud infrastructure, include a device 201.

Figure 3:
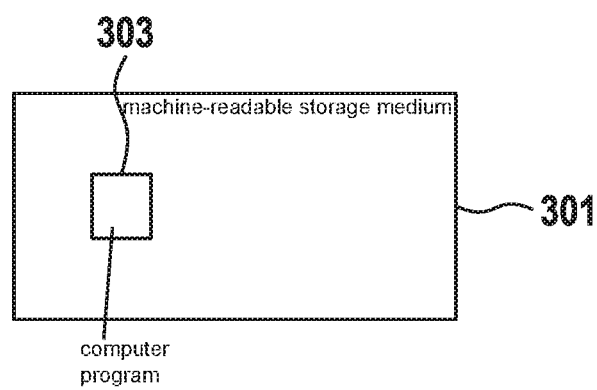
FIG. 3 shows a machine-readable storage medium in accordance with an example embodiment of the present invention.

FIG. 3 shows a machine-readable storage medium 301 in accordance with an example embodiment of the present invention.

A computer program 303 is stored in machine-readable storage medium 301; the computer program including commands, which, in response to execution of computer program 303 by a computer, cause it to implement a method according to the first aspect.

According to one specific embodiment of the present invention, an infrastructure or an infrastructure system is provided, which includes, for example, the device according to the second aspect.

For example, the infrastructure monitors the geographic region, in particular, for motor vehicles, which intend to travel into the geographic region or are situated or traveling within the region. For this monitoring, according to one specific embodiment, one or more surround sensors are provided, which are positioned so as to be spatially distributed on the boundary of the geographic region.

For example, a surround sensor is one of the following surround sensors: radar sensor, lidar sensor, video sensor, ultrasonic sensor, magnetic field sensor and infrared sensor.

According to one specific embodiment of the present invention, the infrastructure system is a navigation infrastructure system. Such a system checks, in particular, if a motor vehicle route to be traveled leads through the region, or if a destination of the motor vehicle lies within the region. Should this be the case, then the motor vehicle is controlled remotely in accordance with example embodiments of the present invention described herein.

An illustrative scenario, in which example embodiments of the present invention described here are used, is described in the following.

According to one specific embodiment of the present invention, a motor vehicle approaches a boundary of a restricted geographic region, for which there is a requirement. Therefore, this means, for example, that in order for a motor vehicle to be allowed to travel into the region, the requirement must be followed by the motor vehicle.

However, the requirement may also specify that a motor vehicle, that is, the motor vehicle specifically intending to enter, may not travel into the region. Thus, for example, the requirement may specify that the region is closed to motor vehicles.

According to one specific embodiment of the present invention, the motor vehicle is connected to the infrastructure, in particular, to the navigation infrastructure system, so as to be able to communicate; or, in front of the region, the motor vehicle is connected, in particular, automatically, to the system or the infrastructure, in particular, so as to be able to communicate automatically.

According to one specific embodiment of the present invention, the motor vehicle emits a signal, in particular, a position signal, and may be detected in this manner.

According to one specific embodiment of the present invention, the motor vehicle is detected, in particular, by the infrastructure, using, for example, visual methods, such as license plate detection.

According to one specific embodiment, the requirement(s) and the motor vehicle, or the route to be traveled by the motor vehicle, are analyzed, in particular, by the infrastructure.

For this, e.g., the route to be traveled may be transmitted by the motor vehicle and/or retrieved by the motor vehicle.

Therefore, this means, in particular, that request signals, which represent a request to the motor vehicle for the route to be traveled, are generated and outputted.

According to one specific embodiment of the present invention, the data transmitted by the motor vehicle, that is, in particular, the route to be traveled, are compared to data from a cloud system, in order to prevent misuse. Data from the cloud system, which may also be referred to as a cloud infrastructure, include, for example, data of the motor vehicle.

In one specific embodiment of the present invention, it is checked if a motor vehicle route to be traveled leads through the region, or if a destination of the motor vehicle lies within the region.

In one specific embodiment of the present invention, if a motor vehicle route to be traveled leads through the region, a new route, which is to the same destination as the destination of the route to be traveled and leads around the region, is ascertained; route signals, which represent the new, ascertained route, being generated and outputted. For example, the new route is transmitted to the motor vehicle, in particular, to a navigation system of the motor vehicle, over a communications network, in particular, a wireless communications network.

This may produce, for example, the technical advantage that the motor vehicle may reach its destination efficiently, without violating the requirement.

According to one specific embodiment of the present invention, if a result of the check indicates that the requirement is not being followed, then one or more of the following actions are carried out or executed:

According to one specific embodiment of the present invention, such an action includes preventing the motor vehicle from entering the region. This is brought about, in particular, by generating and outputting appropriate remote control signals for controlling a lateral and longitudinal guidance of the motor vehicle.

For example, the motor vehicle is only permitted to travel to a parking space (for turning around) or lateral area inside of the region. This is brought about, in particular, by generating and outputting appropriate remote control signals for controlling the lateral and/or longitudinal guidance of the motor vehicle.

For example, the remote control signals are generated on the basis of the route to be traveled or the destination. Consequently, the route and the destination may be taken into account for the remote control in an advantageous manner.

According to one specific embodiment of the present invention, if, for example, the destination is located outside of the region, but the route leads through the region, the remote control signals are generated in such a manner, that in the case of the remote control of the lateral and/or longitudinal guidance of the motor vehicle on the basis of the generated remote control signals, the motor vehicle is guided around the region in the direction of the destination. In this connection, it is preferable for the motor vehicle to be able to be controlled remotely up to the destination, or for the motor vehicle to be controlled remotely until it has traveled around the region.

According to one specific embodiment of the present invention, it is tested if a current traffic situation permits an intervention, that is, in particular, remote control, in order, for example, to prevent other road users in the surroundings of the motor vehicle from being put at risk or injured.

According to one specific embodiment of the present invention, the operation, that is, the method, in other words, the method steps, are documented in a comprehensible manner safe from falsification, for example, in a blockchain.

According to one specific embodiment of the present invention, a driver of the motor vehicle is notified that an intervention in the operation of the motor vehicle has taken place or is taking place, that is, that the motor vehicle has been controlled remotely or is being controlled remotely.

Therefore, this means, in particular, that communication signals, which represent a corresponding communication, are generated and outputted. For example, the communication signals are outputted to a human-machine interface of the motor vehicle, which means that with the aid of the human-machine interface, the driver is informed about the intervention or the remote control on the basis of the communication signals.

According to one specific embodiment of the present invention, the intervention or the remote control of the motor vehicle is communicated to an authority, so that, for example, it may initiate further steps.

According to one specific embodiment of the present invention, a condition for the remote control or for the intervention is that the remote control is safe. In the spirit of the description, "safe" means, in particular, "safe" and "secure." Actually, these two English terms are normally translated into German as "sicker". Nevertheless, these have a partially different meaning in English.

The term "safe" is directed, in particular, to the topic of accident and accident prevention. Remote control, which is "safe," causes, in particular, a probability of an accident or a collision to be less than or less than or equal to a predetermined threshold probability value.

The term "secure" is directed, in particular, to the topic of computer protection and/or hacker protection, that is, in particular, how securely is an (a) (computer) infrastructure and/or a communications infrastructure, in particular, a communication path between a motor vehicle and a remote control device for controlling a motor vehicle remotely, protected from unauthorized access and/or from data manipulation by a third party (hacker).

Thus, remote control, which is "secure," has, in particular, appropriate and sufficient computer protection and/or hacker protection as a basis.

For example, according to one specific embodiment of the present invention, it is tested if the entity made up of a motor vehicle and infrastructure involved in the method according to the first aspect, including communication between the infrastructure and the motor vehicle, is currently secure for the plan, "intervention in the motor vehicle for critical actions," described here. Therefore, this means, in particular, that the motor vehicle and/or a local and/or a global infrastructure and/or communication are appropriately tested. In particular, the remote control signals are generated on the basis of a result of the testing.

Thus, this means, in particular, that the components, which are used during the execution of the method according to the first aspect, are tested for safety, that is, as to whether these satisfy specific safety conditions, before the intervention in the vehicle operation is carried out, that is, before the motor vehicle is controlled remotely.

Important or dependent criteria include, for example, one or more of the safety conditions described above.

According to one specific embodiment of the present invention, first of all, the overall system (motor vehicle, infrastructure, communication path, cloud, . . . ) is tested with regard to the safety condition.

According to one specific embodiment of the present invention, the individual parts are also tested with regard to satisfying the safety condition. This, in particular, prior to the remote control of the motor vehicle.

In this context, in one specific embodiment of the present invention, the testing step(s) are executed inside the motor vehicle and/or outside the motor vehicle, in particular, in an infrastructure.

According to one specific embodiment of the present invention, the checking step(s) are tested subsequently, that is, at a later time, for example, at regular intervals. For example, the testing step(s) are tested subsequently at a predetermined frequency, for example, every 100 ms.

For example, according to one specific embodiment of the present invention, this testing, that is, the test as to whether the at least one safety condition is satisfied, takes place prior to and/or after and/or during one or more predetermined method steps.

According to one specific embodiment of the present invention, the testing is carried out or executed in response to problems.

What is claimed is:

1. A method for controlling a motor vehicle remotely, comprising the following steps:
   receiving requirement signals, which represent at least one requirement that is in force for a restricted geographic region and must be followed by motor vehicles, wherein the restricted geographic region is restricted by the at least one requirement that is in force;
   receiving navigation signals, which represent a route to be traveled by the motor vehicle;
   based on the navigation signals, checking whether the at least one requirement is being followed by the motor vehicle, the checking including a check as to whether the route to be traveled by the motor vehicle violates the at least one requirement;
   generating remote control signals for controlling a lateral and/or longitudinal guidance of the motor vehicle remotely, based on a result of the check as to whether the at least one requirement is being followed by the motor vehicle; and
   outputting the generated remote control signals,
   controlling the lateral and/or longitudinal guidance of the motor vehicle remotely, based on the result of the check as to whether the at least one requirement is being followed by the motor vehicle indicates that the motor vehicle does not follow the at least one requirement,
   wherein in response to noncompliance with the at least one requirement, the remote control signals are generated in such a manner that, in a case of remote control of the lateral and/or longitudinal guidance of the motor vehicle based on the generated remote control signals, when the motor vehicle intends to travel into the region, the motor vehicle enters the region and stops in a predetermined area within the region.

2. The method as recited in claim 1, wherein in response to noncompliance with the at least one requirement, the remote control signals are generated in such a manner that, in the case of remote control of the lateral and/or longitudinal guidance of the motor vehicle based on the generated remote control signals, (i) when the motor vehicle is traveling within the region, the motor vehicle leaves the region, or (ii) when the motor vehicle intends to travel into the region, the motor vehicle does not enter the region.

3. The method as recited in claim 1, wherein the remote control signals are generated based on the navigation signals.

4. The method as recited in claim 1, wherein the requirement specifies at least one road, which is inside of the region and is closed to motor vehicles, and wherein the check as to whether the route to be traveled by the motor vehicle violates the at least one requirement, includes a check as to whether the route to be traveled at least partially includes the at least one road closed to motor vehicles, and the remote control signals are generated based on a result of the determination as to whether the route to be traveled at least partially includes the at least one road closed to motor vehicles.

5. The method as recited in claim 1, further comprising:
   receiving surrounding-area signals which represent a surrounding area of the motor vehicle, wherein the remote control signals are generated based on the surrounding area.

6. The method as recited in claim 1, further comprising:
   receiving safety condition signals, which represent at least one safety condition that must be satisfied so that the motor vehicle may be controlled remotely; and
   checking whether the at least one safety condition is satisfied;
   wherein the remote control signals are generated based on a result of the check as to whether the at least one safety condition is satisfied.

7. The method as recited in claim 6, wherein the at least one safety condition is, in each instance, an element selected from the following groups of safety conditions:
   (i) presence of a predetermined safety integrity level or automotive safety integrity level of at least the motor vehicle and an infrastructure, including a communication path and/or communications components, for controlling the motor vehicle remotely;
   (ii) presence of a maximum latency time of a communication between the motor vehicle and a remote control device for controlling the motor vehicle remotely based on the remote control signals;
   (iii) presence of a predetermined computer protection level of a device for executing the steps of the method;
   (iv) presence of predetermined components and/or algorithms and/or communication options, which are used for executing the steps of the method;
   (v) presence of redundancy and/or diversity in predetermined components and/or algorithms and/or communication options, which are used for executing the steps of the method;
   (vi) presence of predetermined availability information, which indicates an availability of predetermined components and/or algorithms and/or communication options;
   (vii) presence of predetermined quality criteria of the predetermined components and/or algorithms and/or communication options;
   (viii) presence of a plan, which includes measures for reducing faults and/or measures in response to failures of predetermined components and/or algorithms and/or communication options and/or measures for incorrect analyses and/or measures in response to incorrect interpretations;
   (ix) presence of one or more fallback scenarios;
   (x) presence of a predetermined function;
   (xi) presence of a predetermined traffic situation;
   (xii) presence of predetermined weather;
   (xiii) presence of a maximum possible time for a specific performance or execution of one step or more steps of the method;

(xiv) presence of a test result, that elements or functions, which are used for executing the method, are presently functioning correctly.

8. The method as recited in claim 6 wherein the remote control signals are generated only when the at least one safety condition is satisfied.

9. The method as recited in claim 6, wherein the check as to whether the at least one safety condition is satisfied is carried out after and/or during one or more of the method steps.

10. The method as recited in claim 1, further comprising:
after the outputting of the remote control signals, testing remote control of the motor vehicle based on the outputted remote control signals to detect a fault;
wherein, in response to detection of the fault, the remote control is broken off, or emergency remote control signals for controlling the lateral and/or longitudinal guidance of the motor vehicle remotely in an emergency are generated and output.

11. The method as recited in claim 1, further comprising:
receiving boundary vicinity signals, which represent a vicinity of a boundary of the geographic region;
processing the boundary vicinity signals to detect an arriving motor vehicle, which intends to travel into the geographic region;
wherein, in response to detection of an arriving motor vehicle, the step of checking whether the at least one requirement is being followed by the motor vehicle, is executed, and/or the step of receiving navigation signals is executed, and/or the step of receiving requirement signals is executed.

12. The method as recited in claim 1, wherein it is tested if an entity made up of the motor vehicle and infrastructure involved in the method, including communication between the infrastructure and the motor vehicle, is safe, so that the motor vehicle and/or a local infrastructure and/or a global infrastructure and/or communication between the motor vehicle and the infrastructure, are tested.

13. The method as recited in claim 1, wherein one or more method steps, except the steps of generating and outputting the remote control signals, are executed at least partially inside the motor vehicle.

14. The method as recited in claim 1, wherein one or more method steps are executed outside of the motor vehicle in a cloud infrastructure.

15. The method as recited in claim 1, wherein one or more of the method steps are documented in a blockchain.

16. The method as recited in claim 1, wherein the at least one requirement is motor-vehicle-specific, so that the at least one requirement only has to be followed by motor vehicles that have at least one predetermined feature, wherein it is checked if the motor vehicle has the at least one predetermined feature, and wherein the generation of the remote control signals and/or the checking based on the navigation signals is carried out based on a result of the check as to whether the motor vehicle has the at least one predetermined feature.

17. The method as recited in claim 16, wherein the at least one predetermined feature is, in each instance, an element selected from the following group of features: motor vehicle model, year of manufacture, type of driving engine, license plate elements including letters or numerals, order of the license plate elements, license plate.

18. A device configured to control a motor vehicle remotely, the device configured to:
receive requirement signals, which represent at least one requirement that is in force for a restricted geographic region and must be followed by motor vehicles, wherein the restricted geographic region is restricted by the at least one requirement that is in force;
receive navigation signals, which represent a route to be traveled by the motor vehicle;
based on the navigation signals, check whether the at least one requirement is being followed by the motor vehicle, the check including a check as to whether the route to be traveled by the motor vehicle violates the at least one requirement;
generate remote control signals for controlling a lateral and/or longitudinal guidance of the motor vehicle remotely, based on a result of the check as to whether the at least one requirement is being followed by the motor vehicle; and
output the generated remote control signals, and
control the lateral and/or longitudinal guidance of the motor vehicle remotely, based on the result of the check as to whether the at least one requirement is being followed by the motor vehicle indicates that the motor vehicle does not follow the at least one requirement,
wherein in response to noncompliance with the at least one requirement, the remote control signals are generated in such a manner that, in a case of remote control of the lateral and/or longitudinal guidance of the motor vehicle based on the generated remote control signals when the motor vehicle intends to travel into the region, the motor vehicle enters the region and stops in a predetermined area within the region.

19. A non-transitory machine-readable storage medium on which is stored a computer program for controlling a motor vehicle remotely, the computer program, when executed by a computer, causing the computer to perform the following steps:
receiving requirement signals, which represent at least one requirement that is in force for a restricted geographic region and must be followed by motor vehicles, wherein the restricted geographic region is restricted by the at least one requirement that is in force;
receiving navigation signals, which represent a route to be traveled by the motor vehicle;
based on the navigation signals, checking whether the at least one requirement is being followed by the motor vehicle, the checking including a check as to whether the route to be traveled by the motor vehicle violates the at least one requirement;
generating remote control signals for controlling a lateral and/or longitudinal guidance of the motor vehicle remotely, based on a result of the check as to whether the at least one requirement is being followed by the motor vehicle; and
outputting the generated remote control signals,
controlling the lateral and/or longitudinal guidance of the motor vehicle remotely, based on the result of the check as to whether the at least one requirement is being followed by the motor vehicle indicates that the motor vehicle does not follow the at least one requirement,
wherein in response to noncompliance with the at least one requirement, the remote control signals are generated in such a manner that, in a case of remote control of the lateral and/or longitudinal guidance of the motor vehicle based on the generated remote control signals when the motor vehicle intends to travel into the region, the motor vehicle enters the region and stops in a predetermined area within the region.

20. The method as recited in claim 6, wherein the check as to whether the at least one safety condition is satisfied is carried out prior to one or more of the method steps.

* * * * *